United States Patent Office 3,008,799
Patented Nov. 14, 1961

3,008,799
PREPARATION OF CYCLIC PHOSPHONITRILIC CHLORIDE POLYMERS
Norman Lovelace Paddock, Wolverhampton, and Harold Trevor Searle, Birmingham, England, assignors to Albright & Wilson (Mfg.) Limited, Oldbury, near Birmingham, England, a British company
No Drawing. Filed Dec. 4, 1958, Ser. No. 778,073
Claims priority, application Great Britain Dec. 12, 1957
5 Claims. (Cl. 23—14)

This invention is for improvements in or relating to the preparation of cyclic phosphonitrilic chloride polymers and has for an object to provide a process for the production of substantially pure lower cyclic phosphonitrilic chloride polymers from mixtures of such polymers, utilising the fact that the individual polymers have different base strengths. One of the advantages of this procedure over conventional separation techniques is that the process does not involve the application of heat, hence no losses occur due to polymerisation of the phosphonitrilic chlorides, and the recovery is quantitative.

The reaction of phosphorus pentachloride with ammonium chloride by the method described by Schenk and Römer, Berichte 57B, 1343 (1924), gives rise to two series of compounds: (a) a mixture of cyclic phosphonitrilic chloride polymers, $(PNCl_2)_n$, where $n$ is an integer of from 3 to 7 or more, and (b) a mixture of linear $PNCl_2$ chains end-blocked with the elements of phosphorus pentachloride. These two series of compounds may be separated with low-boiling petroleum ethers, in which the cyclic polymers are soluble and the linear polymers are not.

Previous methods for separating the mixture of cyclic polymers into its constituent polymers have utilised distillation techniques. Distillations have been carried out either on the purified mixture of cyclic polymers or on various selected fractions obtained by crystallisation of the mixture, see, for example, H. N. Stokes, American Chemical Journal, 19, 782 (1897), and Schenk and Römer, loc. cit. Such procedures lead to losses in the amount of recoverable product due to further polymerisation of the polyphosphonitrilic chlorides.

The preparation of the perchlorates of the trimer and tetramer by Bode et al., Chem. Ber., 81, 547 (1948), indicated that the phosphonitrilic chloride polymers could act as bases.

It has now been found that the lower cyclic phosphonitrilic chloride polymers, containing from 3 to 7 inclusive $PNCl_2$ units, are weak bases with different base constants, and accordingly the solubilities of the individual polymers in concentrated solutions of strong acids differ from each other. This fact may be used as a basis for the separation of a mixture of these polymers, since the polymers may be recovered unchanged from the acid solution, for example by dilution of the acid and re-extraction with inert organic solvent.

According to the present invention, there is provided a process for the preparation of a substantially pure cyclic phosphonitrilic chloride polymer, of formula $(PNCl_2)_n$ wherein $n$ is an integer of from three to seven inclusive, which comprises differentially partitioning a mixture of such polymers between an inert organic solvent and an acid medium, e.g. a concentrated strong acid; the polymer may be recovered from either the acidic medium or the organic solvent as required.

The base constants of the polymers are of such a magnitude that the polymers are appreciably soluble only in concentrated solutions of strong acids. If the mixture of polymers is prepared according to the method of Schenk and Römer, loc. cit., the proportions in which the individual polymers are extracted into a concentrated solution of a strong acid from solution in an inert organic solvent decrease in the order 1st the trimer, 2nd the hexamer, 3rd the tetramer and 4th the pentamer.

When a polymer is partitioned between an acid and an inert organic solvent, the distribution ratio, which is the ratio at equilibrium of the concentration of the polymer in the acid layer to the concentration of the polymer in the inert organic solvent layer, has been found to depend upon the concentration of the polymer in the acid. This dependence can be expressed in the form of a curve relating the distribution ratio to concentration in the acid.

Similar curves can be constructed for each polymer for chosen concentrations of strong acids, and comparisons of these curves may be used to predict the best conditions for, and the results of, a fractionation scheme. The use of the acid forms of ion exchange resins, instead of the acid solutions, is also envisaged.

One method of practising the invention is as follows: A solution of mixed cyclic phosphonitrilic chlorides in an inert organic solvent is extracted with a concentrated solution of a strong acid, the extracted material being recovered by dilution of the acid and re-extraction with the inert organic solvent which is then evaporated off. Example 2 illustrates this method.

Alternatively, the solvent may be used to extract polymers selectively from the acid layer. Either method may be carried out as a single stage, multi-stage or continuous process.

A suitable acid for use in the process of this invention is a strong mineral acid, e.g. sulphuric acid. The acid forms of ion exchange resins such as that sold under the name Zeo-Karb 225 (Zeo-Karb is a registered trademark) may, however, be used in place of the acid.

Any inert organic solvent with a low boiling point is suitable, such as, for example, petroleum ether boiling between 40° C. and 60° C.

When using an acid form of an ion exchange resin, a solution of the polymers in an inert organic solvent is passed through a column of the resin whereafter the adsorbed polymers, which are distributed along the length of the column, are selectively eluted by passing an inert organic solvent through the column.

The following Examples serve to illustrate the manner in which the invention may be carried into effect:

*Example I.*—This example shows how the distribution ratios for two of the lower phosphonitrilic chloride polymers, the tetramer and the hexamer, vary with the concentration of the polymers in the acid, and illustrates the differences between the distribution ratios for the two polymers.

Solutions of pure tetrameric phosphonitrilic chloride in petroleum ether, B.P. 40°–60° C., were shaken with 98.7% sulphuric acid solutions at temperatures between 24° C. and 26° C. until the polymer had attained equilibrium between the two solvents. The concentration of the polymer in each solvent was determined and the distribution ratio was calculated. The experiments were repeated with solutions of pure hexameric phosphonitrilic chloride, and the results are tabulated below:

| Concentration of polymer in the 98.7% sulphuric acid at equilibrium (moles/litre) | Distribution ratio for tetramer | Distribution ratio for hexamer |
|---|---|---|
| 0.40 | 39 | 37 |
| 0.30 | 47 | 94 |
| 0.20 | 57 | 194 |
| 0.10 | 59 | 195 |

*Example II.*—A mixture of cyclic polymers was obtained from a crude mixture of polyphosphonitrilic chloride compounds prepared by the method of Schenk and Römer, by extraction with low-boiling petroleum ether. 1193 gms. of this mixture of cyclic polymers were dissolved in 4 litres of petroleum ether, B.P. 40°–60° C., and extracted at room temperature with successive portions of 98.7% sulphuric acid. The material extracted in each sulphuric acid fraction was recovered by dilution of the acid and re-extraction with more petroleum ether and identified.

The table below illustrates the results obtained:

| Material in the petroleum ether layer | No. of Fraction | Volume of 98.7% sulphuric acid used in the Fraction, mls. | Percentage of cyclic polymer extracted in the Fraction | Identification of polymers in the material extracted |
|---|---|---|---|---|
| 1,193 gms. mixture in 4 litre petrol. | 1 | 300 | 20 | Trimer. |
| Residue from 1 | 2 | 150 | 14.1 | Trimer+a little hexamer. |
| Residue from 2 | 3 | 150 | 7.2 | Do. |
| Residue from 3 | 4 | 100 | 6.3 | Trimer+some hexamer+a little tetramer. |
| Residue from 4 | 5 | 100 | 5.7 | Hexamer+some trimer+a little tetramer. |
| Residue from 5 | 6 | 120 | 7.5 | Tetramer+some pentamer+some hexamer. |
| Residue from 6 | 7 | 120 | 7.1 | Tetramer+pentamer mainly. |
| Residue from 7 | | | 32.1 | Tetramer, a little pentamer and hexamer +higher Polymers. |

*Example III.*—A solution of 255 gms. of a mixture of cyclic polymers, from the same source as the material used in Example II, in 1 litre of petroleum ether, boiling between 40° C. and 60° C., was placed in a vertical glass tube at room temperature. Through this column of solution was passed dropwise a 98.5% solution of sulphuric acid. Provision was made for stirring the two liquids together. 260 mls. of acid, passed through the column in this manner, extracted 67.9 gms. (26.6% of the mixture) of trimeric phosphonitrilic chloride from the petroleum ether solution into the acid.

We claim:

1. A process for the preparation of a substantially pure cyclic phosphonitrilic chloride polymer, of formula $(PNCl_2)_n$ wherein $n$ is an integer of from three to seven inclusive, which comprises differentially partitioning a mixture of such polymers between an inert organic solvent and a strong mineral acid.

2. A process for the preparation of a substantially pure cyclic phosphonitrilic chloride polymer, of formula $(PNCl_2)_n$ wherein $n$ is an integer of from three to seven inclusive, which comprises differentially partitioning a mixture of such polymers between an inert organic solvent and a concentrated solution of a strong mineral acid.

3. A process according to claim 2 wherein said strong mineral acid is sulphuric acid.

4. A process according to claim 1 wherein the polymer is recovered from the strong mineral acid by extraction therefrom by means of an inert organic solvent.

5. A process according to claim 1 wherein the inert organic solvent is a petroleum ether of low boiling point.

References Cited in the file of this patent

UNITED STATES PATENTS 2,757,081    Huré et al.    July 31, 1956

OTHER REFERENCES

H. N. Stokes: American Chemical Journal, vol. 17, 1895, pages 279–282, 283, 287–289.